United States Patent
Kulp

(10) Patent No.: US 7,169,030 B1
(45) Date of Patent: Jan. 30, 2007

(54) CHEMICAL MECHANICAL POLISHING PAD

(75) Inventor: Mary Jo Kulp, Newark, DE (US)

(73) Assignee: Rohm and Haas Electronic Materials CMP Holdings, Inc., Newark, DE (US)

( * ) Notice: Subject to any disclaimer, the term of this patent is extended or adjusted under 35 U.S.C. 154(b) by 0 days.

(21) Appl. No.: 11/442,076

(22) Filed: May 25, 2006

(51) Int. Cl.
*B24D 11/00* (2006.01)

(52) U.S. Cl. ...................................... 451/527; 451/526

(58) Field of Classification Search ........ 451/526–539; 51/299, 300
See application file for complete search history.

(56) References Cited

U.S. PATENT DOCUMENTS

| | | | |
|---|---|---|---|
| 3,577,386 A * | 5/1971 | Maier ........................... | 528/92 |
| 5,578,362 A | 11/1996 | Reinhardt et al. | |
| 5,814,409 A | 9/1998 | Hane et al. | |
| 6,022,268 A | 2/2000 | Roberts et al. | |
| 6,022,903 A | 2/2000 | Younes et al. | |
| 6,095,902 A * | 8/2000 | Reinhardt ..................... | 451/36 |
| 6,267,644 B1 | 7/2001 | Molnar | |
| 6,454,634 B1 | 9/2002 | James et al. | |
| 6,514,301 B1 | 2/2003 | Lombardo | |
| 6,648,733 B2 * | 11/2003 | Roberts et al. ................ | 451/41 |
| 6,682,402 B1 * | 1/2004 | Roberts et al. ................ | 451/41 |
| 6,736,709 B1 | 5/2004 | James et al. | |
| 6,860,802 B1 | 3/2005 | Vishwanathan et al. | |
| 7,074,115 B2 | 7/2006 | James et al. | |
| 2003/0148722 A1 | 8/2003 | Lombardo et al. | |
| 2004/0198193 A1 | 10/2004 | Tajima et al. | |
| 2005/0171225 A1 | 8/2005 | Kulp | |

OTHER PUBLICATIONS

Szycher, Michael; Szycher's Handbook of Polyurethanes, 1999, pp. 11-1:11-23, CRC Press LLC, USA.

* cited by examiner

*Primary Examiner*—Dung Van Nguyen
(74) *Attorney, Agent, or Firm*—Blake T. Biederman

(57) ABSTRACT

The polishing pad is suitable for planarizing at least one of semiconductor, optical and magnetic substrates. The polishing pad includes a polymeric matrix having a top polishing surface; and the top polishing surface has polymeric polishing asperities or forms polymeric polishing asperities upon conditioning with an abrasive. The polymeric polishing asperities extend from the polymeric matrix and represent the portion of the top polishing surface that can contact a substrate during polishing. The polymeric polishing asperities are from a polymeric material having a bulk ultimate tensile strength of at least 6,500 psi (44.8 MPa) and a bulk tear strength of at least 250 lb/in. ($4.5 \times 10^3$ g/mm).

10 Claims, 1 Drawing Sheet

CHEMICAL MECHANICAL POLISHING PAD

BACKGROUND

This specification relates to polishing pads useful for polishing and planarizing substrates, such as semiconductor substrates or magnetic disks.

Polymeric polishing pads, such as polyurethane, polyamide, polybutadiene and polyolefin polishing pads represent commercially available materials for substrate planarization in the rapidly evolving electronics industry. Electronics industry substrates requiring planarization include silicon wafers, patterned wafers, flat panel displays and magnetic storage disks. In addition to planarization, it is essential that the polishing pad not introduce excessive numbers of defects, such as scratches or other wafer non-uniformities. Furthermore, the continued advancement of the electronics industry is placing greater demands on the planarization and defectivity capabilities of polishing pads.

For example, the production of semiconductors typically involves several chemical mechanical planarization (CMP) processes. In each CMP process, a polishing pad in combination with a polishing solution, such as an abrasive-containing polishing slurry or an abrasive-free reactive liquid, removes excess material in a manner that planarizes or maintains flatness for receipt of a subsequent layer. The stacking of these layers combines in a manner that forms an integrated circuit. The fabrication of these semiconductor devices continues to become more complex due to requirements for devices with higher operating speeds, lower leakage currents and reduced power consumption. In terms of device architecture, this translates to finer feature geometries and increased numbers of metallization levels. These increasingly stringent device design requirements are driving the adoption of smaller and smaller line spacing with a corresponding increase in pattern density. The devices' smaller scale and increased complexity have led to greater demands on CMP consumables, such as polishing pads and polishing solutions. In addition, as integrated circuits' feature sizes decrease, CMP-induced defectivity, such as, scratching becomes a greater issue. Furthermore, integrated circuits' decreasing film thickness requires improvements in defectivity while simultaneously providing acceptable topography to a wafer substrate; these topography requirements demand increasingly stringent planarity, line dishing and small feature array erosion polishing specifications.

Historically, cast polyurethane polishing pads have provided the mechanical integrity and chemical resistance for most polishing operations used to fabricate integrated circuits. For example, polyurethane polishing pads have sufficient tensile strength for resisting tearing; abrasion resistance for avoiding wear problems during polishing; and stability for resisting attack by strong acidic and strong caustic polishing solutions. Unfortunately, the hard cast polyurethane polishing pads that tend to improve planarization, also tend to increase defects.

James et al., in US Pat. Pub. No. 2005/0079806, disclose a family of hard polyurethane polishing pads with planarization ability similar to IC1000™ polyurethane polishing pads, but with improved defectivity performance—IC1000 is a trademark of Rohm and Haas Company or its affiliates. Unfortunately, the polishing performance achieved with the polishing pad of James et al. varies with the polishing substrate and polishing conditions. For example, these polishing pads have limited advantage for polishing silicon oxide/silicon nitride applications, such as direct shallow trench isolation (STI) polishing applications. For purposes of this specification, silicon oxide refers to silicon oxide, silicon oxide compounds and doped silicon oxide formulations useful for forming dielectrics in semiconductor devices; and silicon nitride refers to silicon nitrides, silicon nitride compounds and doped silicon nitride formulations useful for semiconductor applications. These silicon compounds useful for creating semiconductor devices continue to evolve in different directions. Specific types of dielectric oxides in use include the following: TEOS formed from the decomposition of tetraethyloxysilicates, HDP ("high-density plasma") and SACVD ("sub-atmospheric chemical vapor deposition"). There is an ongoing need for additional polishing pads that have superior planarization ability in combination with improved defectivity performance. In particular, there is a desire for polishing pads suitable for polishing oxide/SiN with an improved combination of planarization and defectivity polishing performance.

STATEMENT OF INVENTION

An aspect of the invention provides a polishing pad suitable for planarizing at least one of semiconductor, optical and magnetic substrates, the polishing pad comprising a polymeric matrix, the polymeric matrix having a top polishing surface, the top polishing surface having polymeric polishing asperities or forming polymeric polishing asperities upon conditioning with an abrasive, the polymeric polishing asperities extending from the polymeric matrix and being a portion of the top polishing surface that can contact a substrate during polishing, the polishing pad forming additional polymeric polishing asperities from the polymeric material with wear or conditioning of the top polishing surface, and the polymeric polishing asperities being from a polymeric material having a bulk ultimate tensile strength of at least 6,500 psi (44.8 MPa) and a bulk tear strength of at least 250 lb/in. ($4.5 \times 10^3$ g/mm).

A second aspect of the invention provides a polishing pad suitable for planarizing at least one of semiconductor, optical and magnetic substrates, the polishing pad comprising a polymeric matrix, the polymeric matrix having a top polishing surface, the top polishing surface having polymeric polishing asperities or forming polymeric polishing asperities upon conditioning with an abrasive, the polymeric polishing asperities extending from the polymeric matrix and being the portion of the top polishing surface that can contact a substrate during polishing, the polymeric matrix includes a polymer derived from difunctional or polyfunctional isocyanates and the polymer includes at least one selected from polyetherureas, polyisocyanurates, polyurethanes, polyureas, polyurethaneureas, copolymers thereof and mixtures thereof, the polymeric matrix having a bulk ultimate tensile strength of 6,500 to 14,000 psi (44.8 to 96.5 MPa) and a bulk tear strength of 250 to 750 lb/in. ($4.5 \times 10^3$ to $13.4 \times 10^3$ g/mm).

DETAILED DESCRIPTION

Figure 1:
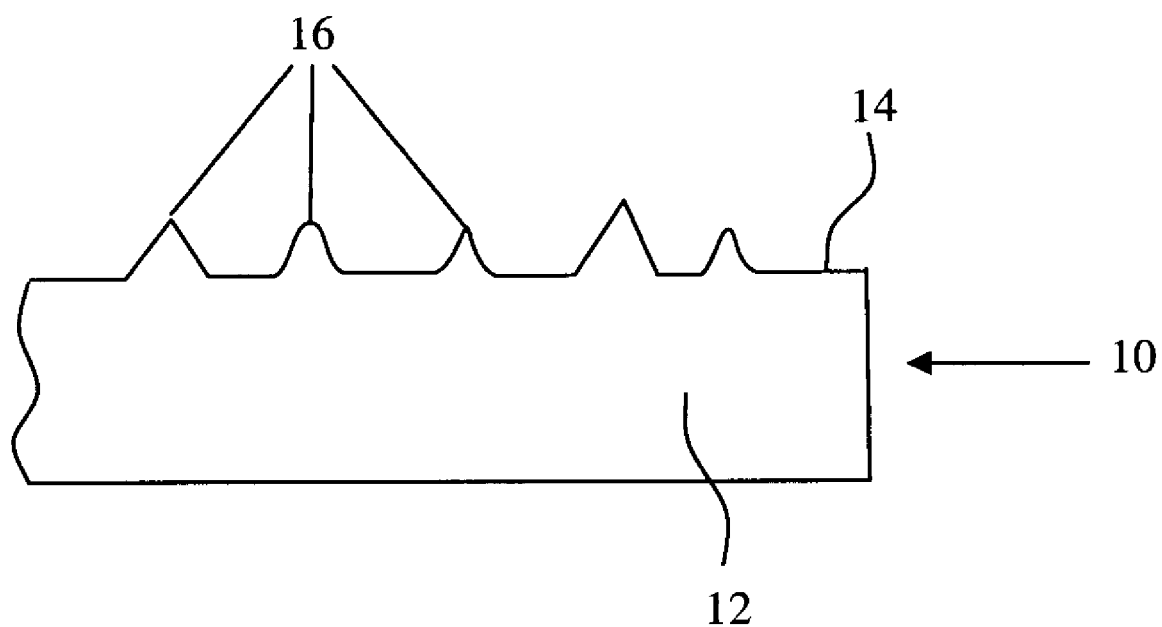
FIG. 1 represents a schematic cross-section illustrating asperities of a broken away portion of a polishing pad.

The invention provides a polishing pad suitable for planarizing at least one of semiconductor, optical and magnetic substrates, the polishing pad comprising a polymeric matrix. The polishing pads are particularly suitable for polishing and planarizing STI applications, such as HDP/SiN, TEOS/SiN or SACVD/SiN. The polishing pad's bulk material properties can have an unexpected benefit in both planarization and defectivity polishing performance. For purposes of this specification, the high tear strength of the bulk material represents the properties of the polymer without the deliberate addition of porosity, such as a non-porous polyurethane polymer. Historical understanding was that a material's compliance reduced scratching and facilitated low defectivity polishing, and that a material's stiffness or rigidity was critical to achieving excellent planarization behavior. In this invention, an increase in a polishing pad's bulk ultimate tensile strength and tear strength act in a manner independent of mechanical property losses associated with increased porosity to facilitate excellent polishing performance. In particular, the invention allows a blending of planarization and defectivity performance to achieve a range of polishing performance. In addition, these pads maintain their surface structure to facilitate eCMP ("electrochemical mechanical planarization") applications. For example, perforations through the pad, the introduction of conductive-lined grooves or the incorporation of a conductor, such as a conductive fiber or metal wire, can transform the pads into eCMP polishing pads.

Referring to FIG. 1, polymeric polishing pad 10 includes polymeric matrix 12 and top polishing surface 14. The polishing surface 14 includes a plurality of polymeric polishing asperities 16 or forms polymeric polishing asperities 16 upon conditioning with an abrasive for controlling the wafer substrate removal rate of the polishing pad 10. For purposes of this specification, asperities represent structures that can contact or have a capability of contacting a substrate during polishing. Typically, conditioning with a hard surface, such as a diamond conditioning disk forms asperities during polishing. These asperities often form near the edge of a pore. Although conditioning can function in a periodic manner, such as for 30 seconds after each wafer or in a continuous manner, continuous conditioning provides the advantage of establishing steady-state polishing conditions for improved control of removal rate. The conditioning typically increases the polishing pad removal rate and prevents the decay in removal rate typically associated with the wear of a polishing pad. In addition to conditioning, grooves and perforations can provide further benefit to the distribution of slurry, polishing uniformity, debris removal and substrate removal rate.

The polymeric polishing asperities 16 extend from the polymeric matrix 12 and represent a portion of the top polishing surface 14 that contacts a substrate. The polymeric polishing asperities 16 are from a polymeric material having a high ultimate tensile strength and the polishing pad 10 forms additional polymeric polishing asperities 16 from the polymeric material with wear or conditioning of the top polishing surface 14.

The polymer matrices' ultimate tensile strength facilitates the silicon oxide removal rate, durability and planarization required for demanding polishing application. In particular, the matrices with high tensile strength tend to facilitate silicon oxide removal rate. The matrix preferably has a bulk ultimate tensile strength of at least 6,500 psi (44.8 MPa). More preferably, the polymer matrix has a bulk ultimate tensile strength of 6,500 to 14,000 psi (44.8 to 96.5 MPa). Most preferably, the polymeric matrix has a bulk ultimate tensile strength of 6,750 to 10,000 psi (46.5 to 68.9 MPa). Furthermore, polishing data indicate that a bulk ultimate tensile strength of 7,000 to 9,000 psi (48.2 to 62 MPa) is particularly useful for polishing wafers. The unfilled elongation at break is typically at least 200 percent and typically between 200 and 500 percent. The test method set forth in ASTM D412 (Version D412-02) is particularly useful for determining ultimate tensile strength and elongation at break.

In addition to ultimate tensile strength, bulk tear strength properties also contribute to the pad's polishing ability. For example, bulk tear strength properties of at least 250 lb/in. ($4.5 \times 10^3$ g/mm) are particularly useful. Preferably, the matrix has bulk tear strength properties of 250 to 750 lb/in. ($4.5 \times 10^3$ to $13.4 \times 10^3$ g/mm). Most preferably, the matrix has bulk tear strength properties of 275 to 700 lb/in. ($4.9 \times 10^3$ to $12.5 \times 10^3$ g/mm). The test method set forth in ASTM D1938 (Version D1938-02) using data analysis techniques outlined in ASTM D624-00e1 is particularly useful for determining bulk tear strength.

Typical polymeric polishing pad materials include polycarbonate, polysulphone, nylon, ethylene copolymers, polyethers, polyesters, polyether-polyester copolymers, acrylic polymers, polymethyl methacrylate, polyvinyl chloride, polycarbonate, polyethylene copolymers, polybutadiene, polyethylene imine, polyurethanes, polyether sulfone, polyether imide, polyketones, epoxies, silicones, copolymers thereof and mixtures thereof. Preferably, the polymeric material is a polyurethane; and most preferably it is not a cross-linked polyurethane. For purposes of this specification, "polyurethanes" are products derived from difunctional or polyfunctional isocyanates, e.g. polyetherureas, polyisocyanurates, polyurethanes, polyureas, polyurethaneureas, copolymers thereof and mixtures thereof.

Cast polyurethane polishing pads are suitable for planarizing semiconductor, optical and magnetic substrates. The pads' particular polishing properties arise in part from a prepolymer reaction product of a prepolymer polyol and a polyfunctional isocyanate. The prepolymer product is cured with a curative agent selected from the group comprising curative polyamines, curative polyols, curative alcohol amines and mixtures thereof to form a polishing pad. It has been discovered that controlling the ratio of the curative agent to the unreacted NCO in the prepolymer reaction product can improve porous pads' defectivity performance during polishing.

The polymer is effective for forming non-porous, porous and filled polishing pads. For purposes of this specification, fillers for polishing pads include solid particles that dislodge or dissolve during polishing, and liquid-filled particles or spheres. For purposes of this specification, porosity includes gas-filled particles, gas-filled spheres and voids formed from other means, such as mechanically frothing gas into a viscous system, injecting gas into the polyurethane melt, introducing gas in situ using a chemical reaction with gaseous product, or decreasing pressure to cause dissolved gas to form bubbles. The polishing pads contain a porosity or filler concentration of at least 0.1 volume percent. This porosity or filler contributes to the polishing pad's ability to transfer polishing fluids during polishing. Preferably, the polishing pad has a porosity or filler concentration of 0.2 to 70 volume percent. Most preferably, the polishing pad has a porosity or filler concentration of 0.3 to 65 volume percent. Preferably the pores or filler particles have a weight average diameter of 1 to 100 μm. Most preferably, the pores or filler particles have a weight average diameter of 10 to 90 μm. The nominal range of expanded hollow-polymeric microspheres' weight average diameters is 15 to 90 μm. Furthermore, a combination of high porosity with small pore size can have particular benefits in reducing defectivity. For example, a pore size of 2 to 50 μm constituting 25 to 65 volume percent of the polishing layer facilitates a reduction in defectivity.

Furthermore, maintaining porosity between 40 and 60 percent can have a particular benefit to defectivity. Additionally, oxide:SiN selectivity is frequently adjustable by adjusting the level of porosity, with higher levels of porosity giving lower oxide selectivity.

Preferably, the polymeric material is a block or segmented copolymer capable of separating into phases rich in one or more blocks of the copolymer. Most preferably the polymeric material is a polyurethane. For purposes of this specification, "polyurethanes" are products derived from difunctional or polyfunctional isocyanates, e.g. polyetherureas, polyesterureas, polyisocyanurates, polyurethanes, polyureas, polyurethaneureas, copolymers thereof and mixtures thereof. An approach for controlling a pad's polishing properties is to alter its chemical composition. In addition, the choice of raw materials and manufacturing process affects the polymer morphology and the final properties of the material used to make polishing pads.

Preferably, urethane production involves the preparation of an isocyanate-terminated urethane prepolymer from a polyfunctional aromatic isocyanate and a prepolymer polyol. For purposes of this specification, the term prepolymer polyol includes diols, polyols, polyol-diols, copolymers thereof and mixtures thereof. Preferably, the prepolymer polyol is selected from the group comprising polytetramethylene ether glycol [PTMEG], polypropylene ether glycol [PPG], ester-based polyols, such as ethylene or butylene adipates, copolymers thereof and mixtures thereof. Example polyfunctional aromatic isocyanates include 2,4-toluene diisocyanate, 2,6-toluene diisocyanate, 4,4'-diphenylmethane diisocyanate, naphthalene-1,5-diisocyanate, tolidine diisocyanate, para-phenylene diisocyanate, xylylene diisocyanate and mixtures thereof. The polyfunctional aromatic isocyanate contains less than 20 weight percent aliphatic isocyanates, such as 4,4'-dicyclohexylmethane diisocyanate, isophorone diisocyanate and cyclohexanediisocyanate. Preferably, the polyfunctional aromatic isocyanate contains less than 15 weight percent aliphatic isocyanates and more preferably, less than 12 weight percent aliphatic isocyanate.

Example prepolymer polyols include polyether polyols, such as, poly(oxytetramethylene)glycol, poly(oxypropylene)glycol and mixtures thereof, polycarbonate polyols, polyester polyols, polycaprolactone polyols and mixtures thereof. Example polyols can be mixed with low molecular weight polyols, including ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof.

Preferably the prepolymer polyol is selected from the group comprising polytetramethylene ether glycol, polyester polyols, polypropylene ether glycols, polycaprolactone polyols, copolymers thereof and mixtures thereof. If the prepolymer polyol is PTMEG, copolymer thereof or a mixture thereof, then the isocyanate-terminated reaction product preferably has a weight percent unreacted NCO range of 8.0 to 15.0 wt. %. For polyurethanes formed with PTMEG or PTMEG blended with PPG, the most preferable weight percent NCO is a range of 8.0 to 10.0 Particular examples of PTMEG family polyols are as follows: Terathane® 2900, 2000, 1800, 1400, 1000, 650 and 250 from Invista; Polymeg® 2900, 2000, 1000, 650 from Lyondell; PolyTHF® 650, 1000, 2000 from BASF, and lower molecular weight species such as 1,2-butanediol, 1,3-butanediol, and 1,4-butanediol. If the prepolymer polyol is a PPG, copolymer thereof or a mixture thereof, then the isocyanate-terminated reaction product most preferably has a weight percent unreacted NCO range of 7.9 to 15.0 wt. %. Particular examples of PPG polyols are as follows: Arcol® PPG-425, 725, 1000, 1025, 2000, 2025, 3025 and 4000 from Bayer; Voranol® 1010L, 2000L, and P400 from Dow; Desmophen® 1110BD, Acclaim® Polyol 12200, 8200, 6300, 4200, 2200 both product lines from Bayer If the prepolymer polyol is an ester, copolymer thereof or a mixture thereof, then the isocyanate-terminated reaction product most preferably has a weight percent unreacted NCO range of 6.5 to 13.0. Particular examples of ester polyols are as follows: Millester 1, 11, 2, 23, 132, 231, 272, 4, 5, 510, 51, 7, 8, 9, 10,16, 253, from Polyurethane Specialties Company, Inc.; Desmophen® 1700, 1800, 2000, 2001KS, 2001K$^2$, 2500, 2501, 2505, 2601, PE65B from Bayer; Rucoflex S-1021-70, S-1043-46, S-1043-55 from Bayer.

Typically, the prepolymer reaction product is reacted or cured with a curative polyol, polyamine, alcohol amine or mixture thereof. For purposes of this specification, polyamines include diamines and other multifunctional amines. Example curative polyamines include aromatic diamines or polyamines, such as, 4,4'-methylene-bis-o-chloroaniline [MBCA], 4,4'-methylene-bis-(3-chloro-2,6-diethylaniline) [MCDEA]; dimethylthiotoluenediamine; trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate; 1,2-bis(2-aminophenylthio)ethane; 4,4'-methylene-bis-aniline; diethyltoluenediamine; 5-tert-butyl-2,4- and 3-tert-butyl-2,6-toluenediamine; 5-tert-amyl-2,4- and 3-tert-amyl-2,6-toluenediamine and chlorotoluenediamine. Optionally, it is possible to manufacture urethane polymers for polishing pads with a single mixing step that avoids the use of prepolymers.

The components of the polymer used to make the polishing pad are preferably chosen so that the resulting pad morphology is stable and easily reproducible. For example, when mixing 4,4'-methylene-bis-o-chloroaniline [MBCA] with diisocyanate to form polyurethane polymers, it is often advantageous to control levels of monoamine, diamine and triamine. Controlling the proportion of mono-, di- and triamines contributes to maintaining the chemical ratio and resulting polymer molecular weight within a consistent range. In addition, it is often important to control additives such as anti-oxidizing agents, and impurities such as water for consistent manufacturing. For example, since water reacts with isocyanate to form gaseous carbon dioxide, controlling the water concentration can affect the concentration of carbon dioxide bubbles that form pores in the polymeric matrix. Isocyanate reaction with adventitious water also reduces the available isocyanate for reacting with chain extender, so changes the stoichiometry along with level of crosslinking (if there is an excess of isocyanate groups) and resulting polymer molecular weight.

The polyurethane polymeric material is preferably formed from a prepolymer reaction product of toluene diisocyanate and polytetramethylene ether glycol with an aromatic diamine. Most preferably the aromatic diamine is 4,4'-methylene-bis-o-chloroaniline or 4,4'-methylene-bis-(3-chloro-2,6-diethylaniline). Preferably, the prepolymer reaction product has a 6.5 to 15.0 weight percent unreacted NCO. Examples of suitable prepolymers within this unreacted NCO range include: Airthane® prepolymers PET-70D, PHP-70D, PET-75D, PHP-75D, PPT-75D, PHP-80D manufactured by Air Products and Chemicals, Inc. and Adiprene® prepolymers, LFG740D, LF700D, LF750D, LF751D, LF753D, L325 manufactured by Chemtura. In addition, blends of other prepolymers besides those listed above could be used to reach to appropriate % unreacted NCO levels as a result of blending. Many of the above-listed prepolymers, such as, LFG740D, LF700D, LF750D, LF751D, and LF753D are low-free isocyanate prepolymers that have less than 0.1 weight percent free TDI monomer and have a more consistent prepolymer molecular weight distribution than conventional prepolymers, and so facilitate forming polishing pads with excellent polishing characteristics. This improved prepolymer molecular weight consistency and low free isocyanate monomer give a more regular polymer structure, and contribute to improved polishing pad consistency. For most prepolymers, the low free isocyanate monomer is preferably below 0.5 weight percent. Furthermore, "conventional" prepolymers that typically have higher levels of reaction (i.e. more than one polyol capped by a diisocyanate on each end) and higher levels of free toluene diisocyanate prepolymer should produce similar results. In addition, low molecular weight polyol additives, such as, diethylene glycol, butanediol and tripropylene glycol facilitate control of the prepolymer reaction product's weight percent unreacted NCO.

In addition to controlling weight percent unreacted NCO, the curative and prepolymer reaction product typically has an OH or $NH_2$ to unreacted NCO stoichiometric ratio of 90 to 125 percent, preferably 97 to 125 percent; and most preferably, it has an OH or $NH_2$ to unreacted NCO stoichiometric ratio of greater than 100 to 120 percent. For example, polyurethanes formed with an unreacted NCO in a range of 101 to 115 percent appear to provide excellent results. This stoichiometry could be achieved either directly, by providing the stoichiometric levels of the raw materials, or indirectly by reacting some of the NCO with water either purposely or by exposure to adventitious moisture.

If the polishing pad is a polyurethane material, then the polishing pad preferably has a density of 0.4 to 1.3 $g/cm^3$. Most preferably, polyurethane polishing pads have a density of 0.5 to 1.25 $g/cm^3$.

EXAMPLES

Example 1

The polymeric pad materials were prepared by mixing various amounts of isocyanates as urethane prepolymers with 4,4'-methylene-bis-o-chloroaniline [MBCA] at 50° C. for the prepolymer and 116° C. for MBCA. In particular, various toluene diiosocyanate [TDI] with polytetramethylene ether glycol [PTMEG] prepolymers provided polishing pads with different properties. The urethane/polyfunctional amine mixture was mixed with the hollow polymeric microspheres (EXPANCEL® 551DE20d60 or 551DE40d42 manufactured by AkzoNobel) either before or after mixing the prepolymer with the chain extender. The microspheres had a weight average diameter of 15 to 50 μm, with a range of 5 to 200 μm, and were blended at approximately 3,600 rpm using a high shear mixer to evenly distribute the microspheres in the mixture. The final mixture was transferred to a mold and permitted to gel for about 15 minutes.

The mold was then placed in a curing oven and cured with a cycle as follows: thirty minutes ramped from ambient temperature to a set point of 104° C., fifteen and one half hours at 104° C. and two hours with a set point reduced to 21° C. The molded article was then "skived" into thin sheets and macro-channels or grooves were machined into the surface at room temperature-skiving at higher temperatures may improve surface roughness. As shown in the Tables, samples 1 to 3 represent polishing pads of the invention and samples A to J represent comparative examples.

TABLE 1

| Formulation | Prepolymer % NCO | Curative:NCO ratio | Pore level, wt. % Expancel 551DE20d60 Microspheres | Elongation at break, % ASTM D412-02 | Solvent (NMP) Swelling ASTM F2214-02 |
|---|---|---|---|---|---|
| 1-1 | 8.75–9.05 | 105 | 3.21 | 90 | 1.92 |
| 1-2 | 8.75–9.05 | 105 | 2.14 | 145 | 2.12 |
| 1-3 | 8.75–9.05 | 105 | 1.07 | 210 | 2.32 |
| A-1 | 8.75–9.05 | 95 | 3.21 | 100 | 1.61 |
| A-2 | 8.75–9.05 | 95 | 2.14 | 130 | 1.61 |
| A-3 | 8.75–9.05 | 95 | 1.07 | 180 | 1.64 |
| B-1 | 8.75–9.05 | 85 | 3.21 | 75 | 1.56 |
| B-2 | 8.75–9.05 | 85 | 2.14 | 95 | 1.55 |
| B-3 | 8.75–9.05 | 85 | 1.07 | 130 | 1.59 |

All samples contained Adiprene ™ LF750D urethane prepolymer from Chemtura-the formulation contains a blend of TDI and PTMEG.
Conditioning pad samples by placing them in 50% relative humidity for five days at 25° C. before testing improved the repeatability of the tensile tests.

Table 1 illustrates the elongation to break of polyurethanes cast with different stoichiometric ratios and varied amounts of polymeric microspheres. The different stoichiometric ratios control the amount of the polyurethane's crosslinking. Furthermore, increasing the quantity of polymeric microspheres generally decreases physical properties, but improves polishing defectivity performance. The resulting elongation at break property of the filled materials does not appear to represent a clear indicator of polishing performance. Sample swelling in n-methyl-pyrrolidone values indicated that that the degree of swelling is an indicator of a formulation's polishing performance. Formulations with swelling values of greater than or equal to 1.67 (ratio of the diameter of the swollen material over the initial diameter) provide improved polishing results (and material can in fact dissolve). The samples with too little swelling represented a strong indicator of poor polishing performance. Samples that dissolved in the n-methyl-pyrrolidone, however, provided both acceptable and unacceptable polishing results—not a clear indicator of polishing results.

Table 2 below provides a series of polyurethanes cast with various amounts of NCO at 85, 95 and 105% stiochiometries.

TABLE 2

| Sample | Prepolymer | Prepolymer wt % NCO | Curative:NCO ratio | Wt % Microspheres |
|---|---|---|---|---|
| 1 | LF750D | 8.75–9.05 | 105 | 0 |
| 2 | LF751D | 8.9–9.2 | 105 | 0 |
| 3 | LF753D | 8.45–8.75 | 105 | 0 |
| A | LF750D | 8.75–9.05 | 95 | 0 |
| B | LF750D | 8.75–9.05 | 85 | 0 |
| A' | LF750D | 8.75–9.05 | 95 | 0 |
| C | L325 | 8.95–9.25 | 85 | 0 |
| C' | L325 | 8.95–9.25 | 85 | 0 |
| D | LF600D | 7.1–7.4 | 95 | 0 |
| E | LF950A | 5.9–6.2 | 95 | 0 |
| F | LF751D | 8.9–9.2 | 95 | 0 |
| G | LF753D | 8.45–8.75 | 95 | 0 |
| H | LF751D | 8.9–9.2 | 85 | 0 |
| I | LF753D | 8.45–8.75 | 85 | 0 |
| J | L325 | 8.95–9.25 | 95 | 0 |

Samples contained Adiprene ™ LF600D, LF750D, LF751D, LF753D, LF950A urethane TDI - PTMEG prepolymer from Chemtura or Adiprene L325 $H_{12}$MDI/TDI-PTMEG prepolymer from Chemtura.
DMA data implied that some samples may contain small amounts of PPG as well as PTMEG.

Prepolymer was heated under a nitrogen gas blanket to lower viscosity and then hand mixed with MBCA at the desired curative:NCO ratio and degassed. Samples were then hand cast as 1/16" (1.6 mm) thick plaques. Cast material was then held in oven for 16 hours at 100° C. to complete the cure. Trouser tear samples were cast directly into a mold rather than cut with a die, and were somewhat thicker than stipulated by ASTM D1938-02.

TABLE 3

| Sample | Curative:NCO ratio | Tensile strength at break, psi/MPa ASTM D412-02 | Median Elongation at break- unfilled polymer, % ASTM D412-02 | Avg. Tear strength, lb/in-(g/mm x $10^3$) ASTM D1938-02 D624-00e1 | Avg. Tear strength, lb/in-(g/mm x $10^3$) ASTM D470 |
|---|---|---|---|---|---|
| 1 | 105 | 7120/49 | 313 | 297 (5.5) | |
| 2 | 105 | 7413/51 | 328 | 336 (6.0) | |
| 3 | 105 | 7187/50 | 303 | 312 (5.6) | |
| A | 95 | 7100*/49* | 230* | | 140* (2.5) |
| B | 85 | 7617/52 | 192 | 146 (2.6) | |
| A' | 95 | 6930/48 | 217 | | |
| C | 85 | 8603/59 | 292 | | |
| C' | 85 | 9468/65 | 320 | | |
| D | 95 | 6700*/46* | 290* | | 115* (2.0) |
| E | 95 | 5500*/38* | 350* | | 125* (2.2) |
| F | 95 | 7500*/52* | 230* | | 145* (2.6) |
| G | 95 | 7500*/52* | 230* | | 130* (2.3) |
| H | 85 | 8111/56 | 235 | 189 (3.4) | |
| I | 85 | 7252/50 | 210 | 159 (2.8) | |
| J | 95 | 8800*/61* | 260* | | 112* (2.0) |

*Indicates values are from Chemtura literature

Table 3 shows the tensile and tear properties of unfilled, bulk elastomers made from various Adiprene polyurethane prepolymers and MBCA. As with the filled materials, the elongation at break is not a clear indicator of polishing performance. The tear strength, however, does correlate to low defectivity polishing performance, with high tear strength giving low defectivity.

Example 2

Pads of 80 mil (2.0 mm) thickness and 22.5 inch (57 cm) diameter were cut from cakes prepared with the process of Example 1. The pads included a circular groove pattern of 20 mil (0.51 mm) width, 30 mil (0.76 mm) depth and 70 mil (1.8 mm) pitch with an SP2150 polyurethane subpad. Polishing with a SpeedFam-IPEC 472 tool on platen 1 at 5 psi (34.5 KPa), 75 rpm platen speed and 50 rpm carrier speed provided comparative polishing data for the different pads. The polishing also relied upon a Kinik CG181060 diamond conditioner. The test wafers include TEOS sheet wafers, silicon nitride sheet wafers and 1 HDP MIT pattern wafer for measuring planarization of Celexis™ CX2000A ceria-containing slurry from Rohm and Haas Electronic Materials CMP Technologies.

TABLE 4

| Formulation Designation | Stoichiometry | Pore Size | Pore Level, g/100 g formulation | Pore Level, Added vol., cc/100 g formulation | Density, g/cc | Shore D Hardness* |
|---|---|---|---|---|---|---|
| B-1 | 85 | small | 3.21 | 54 | 0.697 | 50.4 |
| B-3 | 85 | small | 1.07 | 18 | 0.952 | 61.8 |
| B-3 | 85 | medium | 0.75 | 18 | 0.967 | 60.3 |
| B-1 | 85 | medium | 2.25 | 54 | 0.689 | 49.2 |
| A-2 | 95 | medium | 1.5 | 36 | 0.829 | 55.7 |
| A-2 | 95 | small | 2.14 | 36 | 0.642 | 43.5 |
| A-1 | 95 | small | 3.21 | 54 | 0.764 | 52.9 |
| A-3 | 95 | medium | 0.75 | 18 | 0.977 | 60.5 |
| A-3 | 95 | small | 1.07 | 18 | 0.983 | 61.9 |
| A-1 | 95 | medium | 2.25 | 54 | 0.676 | 48.0 |
| B-2 | 85 | small | 2.14 | 36 | 0.828 | 57.1 |
| B-2 | 85 | medium | 1.5 | 36 | 0.827 | 54.9 |
| 1-1 | 105 | small | 3.21 | 54 | 0.580 | 45.0 |
| 1-2 | 105 | small | 2.14 | 36 | 0.780 | 49.0 |
| 1-3 | 105 | small | 1.07 | 18 | 0.960 | 60.0 |
| 1-1 | 105 | medium | 2.25 | 54 | 0.610 | 42.0 |
| 1-2 | 105 | medium | 1.5 | 36 | 0.810 | 54.0 |
| 1-3 | 105 | medium | 0.75 | 18 | 0.960 | 59.0 |
| IC1000 A2 | 87 | medium | 1.6 | 38 | 0.800 | 55.0 |

Conditioning pad samples by placing them in 50% relative humidity for five days at 25° C. before testing and stacking six 50-mil (1.3 mm) samples improved the repeatability of the Shore D hardness tests using ASTM D2240-05 and density by ASTM 1622-03.

Table 4 shows the formulations with their stoichiometric ratios of chain extender to isocyanate, pore size and level, and the resulting densities and Shore D hardnesses. The small and medium-sized pores were added at different weight levels to achieve the same volume loading as shown by the calculated pore volumes and the measured formulation densities.

Table 5 includes the Opti-Probe 2600 metrology data for TEOS and SiN removal rates generated after polishing the wafers with the experimental pad formulations and Celexis™ CX2000 on platen 1 followed by a buffing step on platen two with a Politex™ polyurethane poromeric polishing pad from Rohm and Haas Electronic Materials CMP Inc. Chatter marks and scratches were quantified using the Compass™ 300 with SEMVision™ G2 review after HF etching wafers to remove approximately 500 Å of SiN from the wafer surface which removes ceria particle contamination and "decorates" defects to make them more obvious.

TABLE 5

| Formulation Designation | Avg_TEOS RR | Avg SiN | Chattermarks, scratches | Selectivity, TEOS/SiN |
|---|---|---|---|---|
| B-1 | 5883 | 376 | 35.8 | 15.7 |
| B-3 | 5421 | 442 | 59.9 | 12.3 |
| B-3 | 5140 | 522 | 53.0 | 9.8 |
| B-1 | 5689 | 361 | 48.0 | 15.8 |
| A-2 | 6008 | 613 | 53.0 | 9.8 |
| A-2 | 6189 | 529 | 54.8 | 11.7 |
| A-1 | 6402 | 675 | 61.0 | 9.5 |
| A-3 | 5823 | 957 | 151.8 | 6.1 |
| A-3 | 5346 | 230 | 11 | 23.2 |
| A-1 | 6043 | 428 | 135.7 | 14.1 |
| B-2 | 5904 | 430 | 373.0 | 13.7 |
| B-2 | 5543 | 369 | 73.5 | 15.0 |
| 1-1 | 7309 | 1496 | 33.0 | 4.9 |
| 1-2 | 6903 | 610 | 19.0 | 11.3 |
| 1-3 | 6082 | 284 | 0.7 | 21.4 |
| 1-1 | 6819 | 683 | 126.0 | 10.0 |
| 1-2 | 6676 | 576 | 86.0 | 11.6 |
| 1-3 | 6225 | 266 | 2.0 | 23.4 |
| IC1000 A2 | 6005 | 296 | 100.0 | 20.3 |

These data illustrate much lower defectivity levels are possible with the high tear strength polishing pads of the invention. This result is especially pronounced with formulations using the small pores. In addition, a broad range of TEOS/SiN selectivities is achievable with pads of this invention.

The invention claimed is:

1. A polishing pad suitable for planarizing at least one of semiconductor, optical and magnetic substrates, the polishing pad comprising a polymeric matrix, the polymeric matrix having a top polishing surface, the top polishing surface having polymeric polishing asperities or forming polymeric polishing asperities upon conditioning with an abrasive, the polymeric polishing asperities extending from the polymeric matrix and being a portion of the top polishing surface that can contact a substrate during polishing, the polishing pad forming additional polymeric polishing asperities from the polymeric material with wear or conditioning of the top polishing surface, and the polymeric polishing asperities being from a polymeric material having a bulk ultimate tensile strength of at least 6,500 psi (44.8 MPa) and a bulk tear strength of at least 250 lb/in. ($4.5 \times 10^3$ g/mm).

2. The polishing pad of claim 1 wherein the bulk tear strength is 250 to 750 lb/in. ($4.5 \times 10^3$ to $13.4 \times 10^3$ g/mm).

3. The polishing pad of claim 1 wherein the polymeric matrix includes a polymer derived from difunctional or polyfunctional isocyanates and the polymeric polyurethane includes at least one selected from polyetherureas, polyisocyanurates, polyurethanes, polyureas, polyurethaneureas, copolymers thereof and mixtures thereof.

4. The polishing pad of claim 3 wherein the polymeric matrix is from the reaction product of a curative agent and an isocyanate-terminated polymer, the curative agent contains curative amines that cure the isocyanate-terminated reaction product and the isocyanate-terminated reaction product has an $NH_2$ to NCO stoichiometric ratio of 90 to 125 percent.

5. The polishing pad of claim 1 wherein the bulk tensile strength is 6,500 to 14,000 psi (44.8 to 96.5 MPa) and the polymeric matrix has a bulk elongation at break of at least 200 percent.

6. A polishing pad suitable for planarizing at least one of semiconductor, optical and magnetic substrates, the polishing pad comprising a polymeric matrix, the polymeric matrix having a top polishing surface, the top polishing surface having polymeric polishing asperities or forming polymeric polishing asperities upon conditioning with an abrasive, the polymeric polishing asperities extending from the polymeric matrix and being the portion of the top polishing surface that can contact a substrate during polishing, the polymeric matrix includes a polymer derived from difunctional or polyfunctional isocyanates and the polymer includes at least one selected from polyetherureas, polyisocyanurates, polyurethanes, polyureas, polyurethaneureas, copolymers thereof and mixtures thereof, the polymeric matrix having a bulk ultimate tensile strength of 6,500 to 14,000 psi (44.8 to 96.5 MPa) and a bulk tear strength of 250 to 750 lb/in. ($4.5 \times 10^3$ to $13.4 \times 10^3$ g/mm).

7. The polishing pad of claim 6 wherein the bulk tear strength is 275 to 700 lb/in. ($4.9 \times 10^3$ to $12.5 \times 10^3$ g/mm).

8. The polishing pad of claim 6 wherein the polymeric matrix is from the reaction product of a curative agent and an isocyanate-terminated polymer, the curative agent contains curative amines that cure the isocyanate-terminated reaction product and the isocyanate-terminated reaction product has an $NH_2$ to NCO stoichiometric ratio of greater than 100 to 125 percent.

9. The polishing pad of claim 6 wherein the bulk tensile strength is 6,750 to 10,000 psi (46.5 to 68.9 MPa) and the polymeric matrix has a bulk elongation at break of at least 200 percent.

10. The polishing pad of claim 6 including porosity of 25 to 65 volume percent within the polymer matrix and an average pore diameter of 2 to 50 μm.

* * * * *

UNITED STATES PATENT AND TRADEMARK OFFICE
CERTIFICATE OF CORRECTION

PATENT NO.        : 7,169,030 B1
APPLICATION NO.   : 11/442076
DATED             : January 30, 2007
INVENTOR(S)       : Mary Jo Kulp It is certified that error appears in the above-identified patent and that said Letters Patent is hereby corrected as shown below:

Column 6, line 14; after "Bayer" insert --.-- (period).

Column 12, line 10; replace "Avg_TEOS" with --Avg TEOS--.

Column 12, line 47; Claim 1, line 11; replace "polymeric material" with --polymeric matrix--.

Signed and Sealed this

Twenty-seventh Day of November, 2007

JON W. DUDAS
*Director of the United States Patent and Trademark Office*